US012029705B2

(12) United States Patent
Frisch et al.

(10) Patent No.: US 12,029,705 B2
(45) Date of Patent: Jul. 9, 2024

(54) FEEDING BOTTLE WITH ONE-WAY LIQUID FLOW TO PREVENT CONTAMINATION

(71) Applicant: Umbrella Baby LLC, Cedarhurst, NY (US)

(72) Inventors: Ruchama Frisch, Cedarhurst, NY (US); Marco Perry, Brooklyn, NY (US); Curtis Barbre, Brooklyn, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 15/994,707

(22) Filed: May 31, 2018

(65) Prior Publication Data

US 2018/0360694 A1 Dec. 20, 2018

Related U.S. Application Data

(60) Provisional application No. 62/512,938, filed on May 31, 2017.

(51) Int. Cl.

| | |
|---|---|
| ***A61J 9/04*** | (2006.01) |
| ***A61J 11/00*** | (2006.01) |
| ***A61J 11/02*** | (2006.01) |

(52) U.S. Cl.

CPC ............... *A61J 9/04* (2013.01); *A61J 11/002* (2013.01); *A61J 11/008* (2013.01); *A61J 11/02* (2013.01)

(58) Field of Classification Search

CPC ... A61J 11/002; A61J 9/04; A61J 9/003; A61J 11/008

See application file for complete search history.

(56) References Cited

U.S. PATENT DOCUMENTS

| | | | |
|---|---|---|---|
| 1,937,278 | A | 11/1933 | Kleine |
| 2,107,442 | A | 2/1938 | Cecil |
| 2,372,281 | A | 3/1945 | Jordan |
| 2,745,568 | A | 5/1956 | Newton |
| 2,812,092 | A | 11/1957 | Witz |
| 2,876,772 | A | 3/1959 | Witz |
| 2,959,314 | A | 11/1960 | Albert |
| 2,987,209 | A | 6/1961 | Royal |
| 3,211,315 | A | 10/1965 | Griesinger |
| 3,635,380 | A | 1/1972 | Fitzgerald |
| 4,241,768 | A | 12/1980 | Keller et al. |
| 4,339,046 | A | 7/1982 | Coen |
| 4,856,995 | A | 8/1989 | Wagner |

(Continued)

FOREIGN PATENT DOCUMENTS

| | | |
|---|---|---|
| EP | 0 384 394 A2 | 8/1990 |
| GB | 2 169 210 A | 7/1986 |

*Primary Examiner* — Jeffrey R Allen

(74) *Attorney, Agent, or Firm* — Tarter Krinsky & Drogin LLP

(57) ABSTRACT

An insert that has a one-way valve that allows for one-way flow of liquid in response to reduced pressure. The insert is configured to be installed in a baby bottle to form two chambers—a reservoir chamber and a dispensing chamber. The insert also is provided with a valve failure mechanism which allows a user to force the one-way valve open in the absence of reduced pressure, which allows a user to prime the dispensing chamber (the nipple) prior to beginning feeding.

6 Claims, 14 Drawing Sheets

(56) References Cited

U.S. PATENT DOCUMENTS

| | | | | |
|---|---|---|---|---|
| 5,071,017 | A | | 12/1991 | Stull |
| 5,150,800 | A | | 9/1992 | Sarter et al. |
| 5,269,425 | A | * | 12/1993 | Gomez-Acevedo ...... A61J 9/00 215/11.1 |
| 5,433,328 | A | | 7/1995 | Baron et al. |
| 5,474,193 | A | | 12/1995 | Larsson et al. |
| 5,553,726 | A | * | 9/1996 | Park .................... A61J 11/0005 215/11.1 |
| 5,747,083 | A | | 5/1998 | Raymond et al. |
| 5,860,541 | A | | 1/1999 | McIntyre et al. |
| 5,897,007 | A | | 4/1999 | Schein et al. |
| 5,921,426 | A | * | 7/1999 | Randolph ............... A61J 9/001 222/105 |
| 5,938,053 | A | | 8/1999 | Verbovszky et al. |
| 6,042,850 | A | | 3/2000 | Ida et al. |
| 6,112,919 | A | | 9/2000 | Ho |
| 7,225,938 | B2 | | 6/2007 | Frisch |
| 8,636,158 | B2 | * | 1/2014 | Frisch .................... A61J 11/002 215/11.1 |
| 2002/0063103 | A1 | | 5/2002 | Kiernan |
| 2004/0035815 | A1 | | 2/2004 | Webb et al. |
| 2004/0060598 | A1 | * | 4/2004 | Danby ...................... A45F 3/16 137/508 |
| 2004/0211745 | A1 | | 10/2004 | Murray |
| 2004/0245203 | A1 | | 12/2004 | Goldman et al. |
| 2005/0247660 | A1 | | 11/2005 | Michalopoulos |
| 2007/0163983 | A1 | | 7/2007 | Hsu |
| 2017/0355494 | A1 | | 12/2017 | Kalokhe et al. |

* cited by examiner

FEEDING BOTTLE WITH ONE-WAY LIQUID FLOW TO PREVENT CONTAMINATION

RELATED APPLICATIONS

This application claims the priority of U.S. Prov. Appl. Ser. No. 62/512,938 filed May 31, 2017, the contents of which are incorporated by reference herein.

FIELD OF THE INVENTION

The present invention relates to the field of baby feeding devices and more particularly, to an insert for a feeding bottle having a valve that allows for one-way flow of fluid.

BACKGROUND OF THE INVENTION

Baby feeding bottles are commonly used around the globe to feed infants, toddlers and small children. Such feeding bottles typically consist of a bottle and a flexible nursing nipple mounted to its upper opening by way of a threaded cap.

One problem associated with such bottles is that saliva and bacteria may be introduced into the bottle when a baby sucks on the nipple—presenting a risk of spoilage to the rest of the bottle. This is especially problematic when bottle feeding an infant using breast milk or formula, —as oftentimes an infant will consume only a small portion of the bottle, thus, leaving the milk remaining in the bottle bacteria-laden and prone to spoilage.

SUMMARY OF THE INVENTION

The invention described herein is a bottle insert used to form a dual-chambered feeding bottle. A first chamber contains a reservoir of milk (e.g. the bottle portion) and a second chamber dispenses milk (e.g. the nipple portion). An insert having a one-way valve disposed between the chambers allows the flow of milk from the reservoir chamber into the dispensing chamber, but not from the dispensing chamber back into the reservoir chamber. This prevents backflow of bacteria into the reservoir chamber, thus, maintaining the milk substantially free of bacteria for later consumption.

Embodiments of the invention also provide a mechanism for delivering milk from the reservoir chamber to the dispensing chamber in order to "prime the nipple" with milk prior to feeding a child.

DETAILED DESCRIPTION OF THE INVENTION

Embodiments of the present invention will now be described with reference to the above-identified figures. However, the drawings and the description herein of the invention are not intended to limit the scope of the invention. It will be understood that various modifications of the present description of the invention are possible without departing from the spirit of the invention. Also, features or steps described herein may be omitted, additional steps or features may be included, and/or features or steps described herein may be combined in a manner different from the specific combinations recited herein without departing from the spirit of the invention, all as understood by those of skill in the art.

Figure 1:
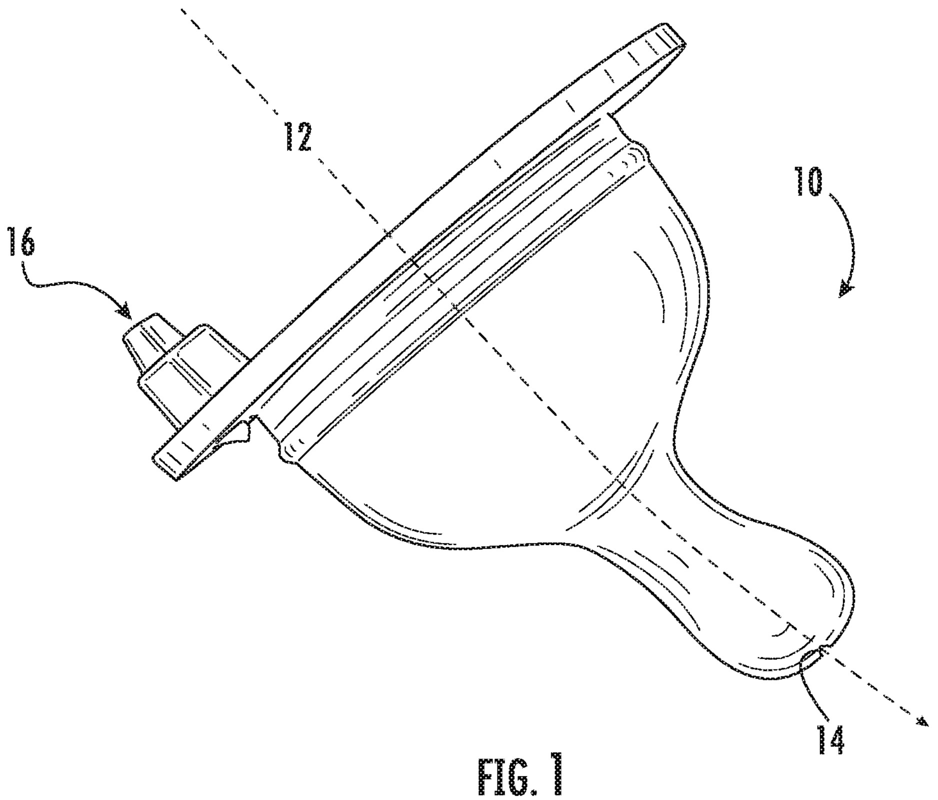
FIG. 1 shows a side view of a nipple that may be used according to an exemplary embodiment of the invention.

FIG. 1 shows a nipple 10 used with a feeding bottle according to an embodiment of the invention. It will be understood that the nipple 10 shown is exemplary only and any of various nipples may be used in embodiments of the invention. In use, nipple 10 is mounted to the top of a bottle and when the bottle is overturned to feed a child, milk flows (in direction of arrow 12) into the nipple and out through an opening 14 in the top of the nipple 10. In order to maintain proper flow of liquid, air must enter into the bottle during feeding. Conventional baby bottles are provided with various modes of introducing air into the inside of the bottle during feeding.

For example, in the nipple shown in FIG. 1, a one-way air intake valve 16 is disposed at the base of the nipple 10 to allow air to enter the bottle when a negative pressure is created by a baby sucking out liquid. Other bottle configurations have an air inlet valve at a bottom segment of the bottle.

In known bottle configurations, liquid such as milk that enters the nipple during feeding is free to flow back into the bottle. As stated, such backwash of liquid may lead to bacteria entering the bottle which jeopardizing the freshness of the remaining milk. This is of particular concern with breast milk that is not easily replaceable. The invention set forth herein prevents such backflow into the bottle once fluid enters the inner confines of the nipple.

In one embodiment of the invention, a barrier is placed at the inside opening of the nipple having a one-way valve. Such barrier positioned at the entrance of the nipple allows for milk to enter the nipple—but prevents milk from retreating back to the bottle. (It will be understood that "milk" used herein is exemplary of a liquid to be dispensed from a baby bottle and any of various liquids such as juice, water, sports drinks etc. are within the teaching of the invention.)

Figure 2:
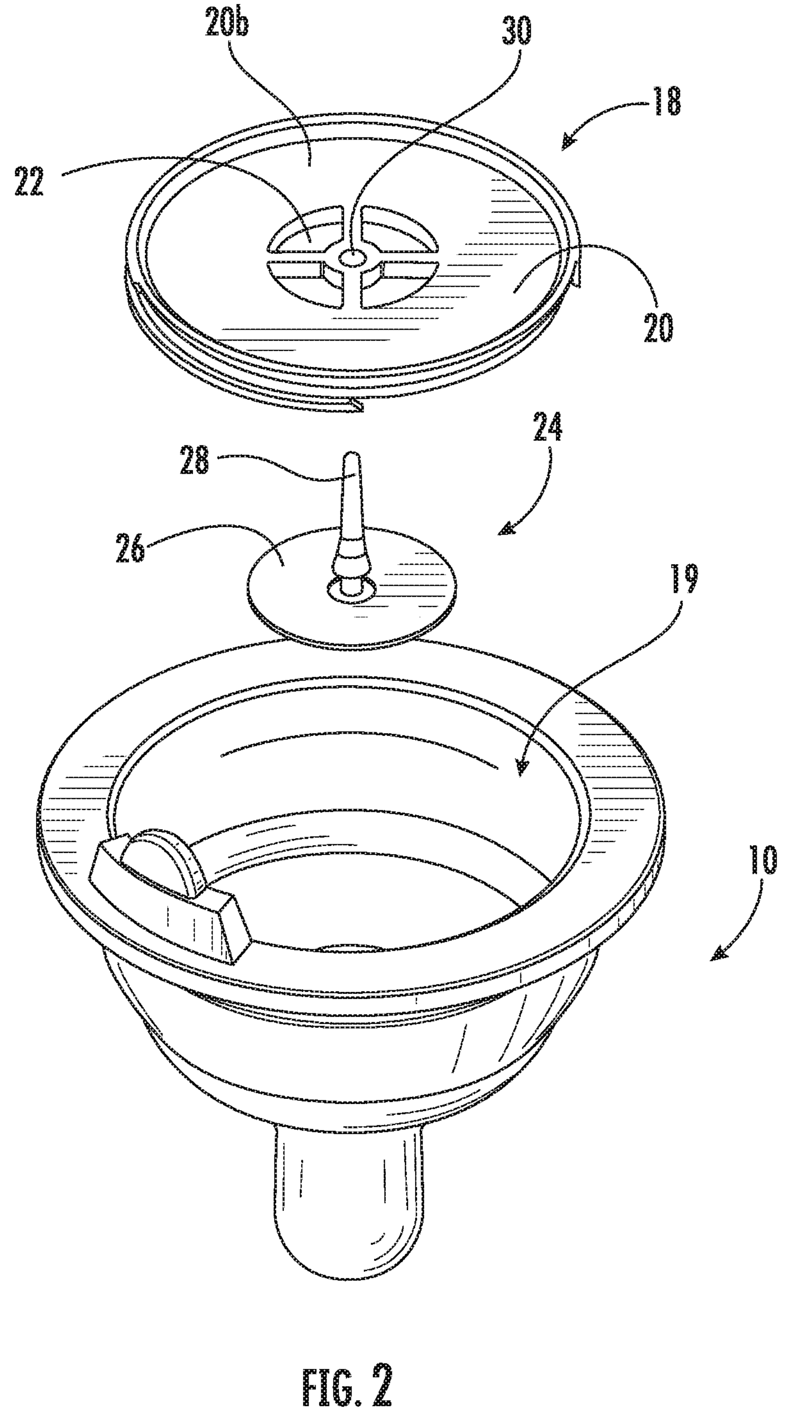
FIG. 2 shows an exploded view of an insert and a nipple according to an exemplary embodiment of the invention.

FIG. 2 shows an exploded view of an insert provided with a one-way valve and a nipple. In embodiments of the invention, insert 18 formed of a circular plate 20 that is sized and shaped to be mounted over the bottom opening 19 of the nipple 10. Plate 20 has a top surface 20*a* (shown e.g. in FIG. 2C) and an underside surface 20*b* shown in FIG. 2.

As shown, one or more small apertures or openings 22 are made in the plate 20, which allow for the passage of fluid; however, a one-way valve is placed over the openings to selectively allow fluid to flow into the nipple during feeding—but not in the reverse direction.

For example, in the embodiment shown in FIG. 2, an umbrella valve 24 is provided as a one-way valve. Umbrella valve 24 is formed of a disc segment 26 and a stem 28 positioned substantially in the center of and orthogonally to the disc segment 26. During assembly of insert 18, the stem 28 of the umbrella valve 24 (shown in FIG. 2A-D) is inserted into a central aperture 30 made in plate. Umbrella valve 24 is oriented such that the disc segment 26 thereof rests on the top surface 20*a* of plate 20 (e.g. the nipple side of plate 20). The one or more apertures 22 lateral to central aperture 30 is covered by disc 24. When suction is applied (during feeding), negative pressure causes disc 24 to move off of apertures 22—allowing for the inflow of fluid into the nipple 10.

Figure 2A:
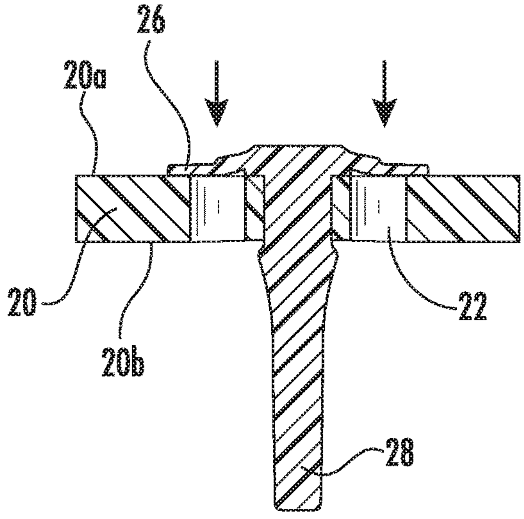
FIGS. 2A-D show cross-sectional views of an insert and accompanying bottle elements according exemplary embodiments of the invention.
Figure 2B:
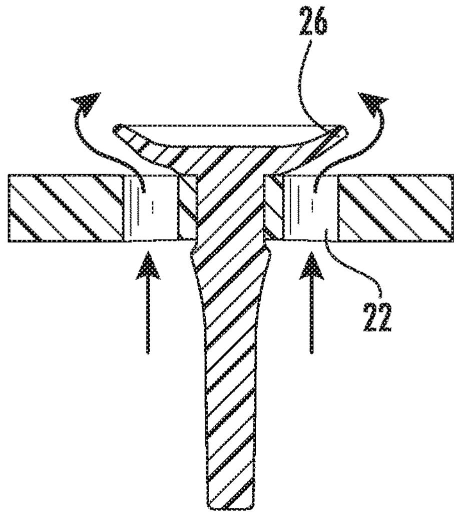

FIG. 2A shows an enlarged cross-sectional view of umbrella valve 24 mounted in plate 20. Disc 26 is shown covering openings 22 thereby preventing backwash of liquid. In response to reduced pressure in the nipple, however, and as shown in FIG. 2B, disc 26 moves off of openings 22 and allows for the one way flow of fluid into the nipple 10.

Figure 2C:
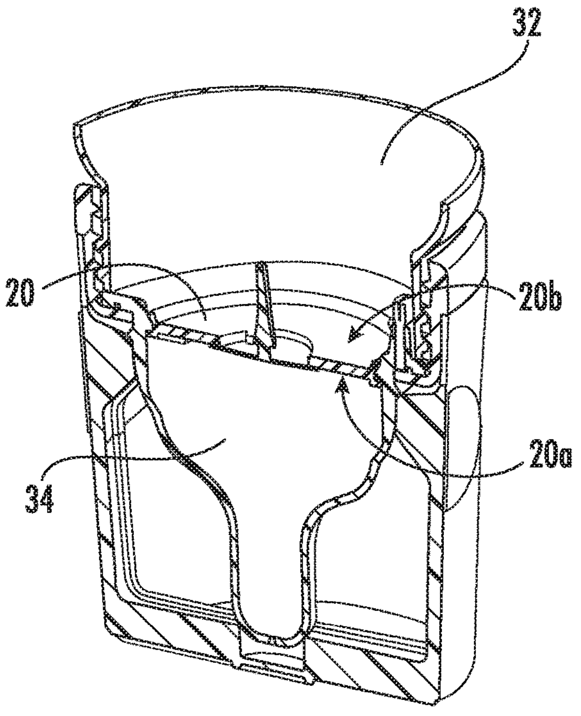
Figure 2D:
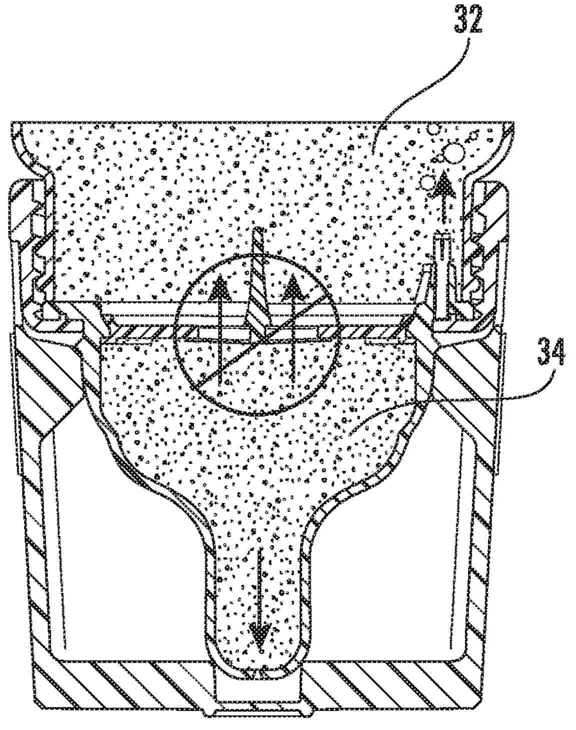

FIG. 2C shows a cross-sectional view of a nipple 10, having an insert 18 mounted on it. As shown, the insert 18 divides the bottle into two chambers—namely, the bottle area that is located beneath plate 18 (the "reservoir chamber" 32) and the bottle area above the insert 18 (the "dispensing chamber" 34). As shown in FIG. 2D, once the nipple 10 becomes filled with fluid, the one-way valve prevents backflow of fluid into the reservoir chamber 32.

It will be understood by those of ordinary skill in the art that any of various one-way valves may be used in different embodiments of the invention to allow liquid flow from a reservoir chamber to the feeding chamber and to prevent flow in the opposition direction, such as for example, slit valves or duckbill valves.

Figure 3A:
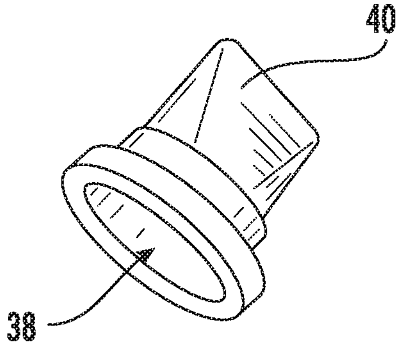
FIGS. 3A-B shown perspective view of duckbill valves according to exemplary embodiments of the invention.
Figure 3B:
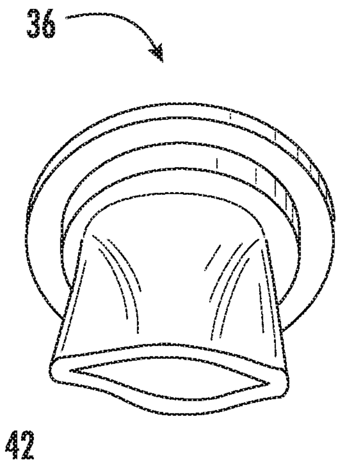
Figure 3C:
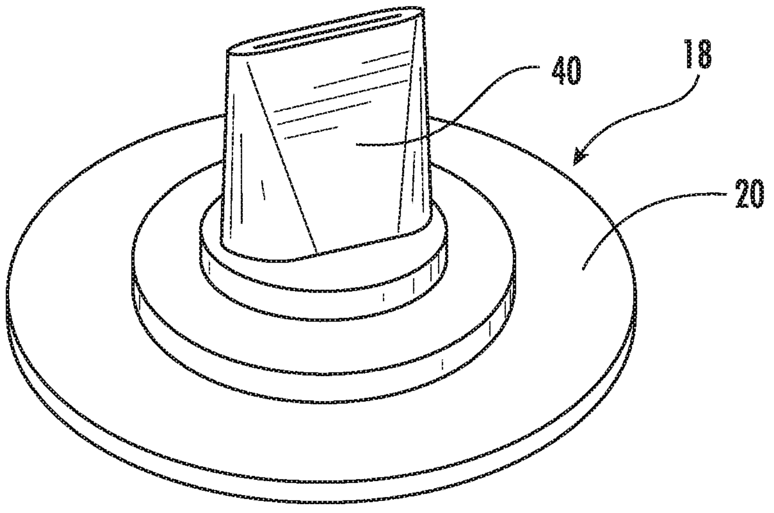
FIG. 3C shows an insert having a duckbill valve thereon according to an exemplary embodiment of the invention.

For example, in embodiments of the invention, and as shown in FIGS. 3A and 3B, a duckbill valve 36 may be used for the purpose of one-way flow. That is, rather than an umbrella valve mounted on plate 20, a duckbill valve may instead by used as a one-way valve, as shown in FIG. 3C. FIG. 3A shows a duck bill valve 36, which has an opening 38 for receiving fluid and a second end that is formed of two flattened walls 40 that contact one another. In its normal state, the duckbill valve 36 does not allow any fluid to pass through the flattened walls 40. However, when negative pressure is applied to the second end (i.e. the flattened walls) or when a fluid is pumped or forcefully driven into the duck valve opening 38—the flattened walls are overcome and they move away from one another to form an opening 42. Once opening 42 is formed, fluid may pass through the duckbill valve 36 in the direction of the reduced pressure (i.e. from the reservoir chamber 32 into the feeding chamber 34). When pressure is removed (negative or positive as described), the duckbill valve 36 returns to its normal position preventing backflow.

In use, a parent will want to fill the dispensing chamber 34 with milk before the infant begins feeding. This makes it possible for the infant to immediately begin drinking milk when he/she starts sucking on the nipple 10, rather than sucking air until enough fluid is drawn into the dispensing chamber 34. In embodiments of the invention, a bottle system, thus, is configured to allow a user to prime the nipple 10 by filling the dispensing chamber 34 with fluid prior to feeding.

In embodiments of the invention, priming of the nipple 10 is achieved by a user causing the one-way valve provided on the insert to temporarily fail. In this regard, the insert 18 is provided with a mechanism to allow a user to selectively fail the one-way valve. For example, in one embodiment of the invention, plate 20 is formed of a deformable material that has elastic or bendable qualities. As such, when a user squeezes the sides thereof, plate 20 will slightly deform. Deformation of the plate causes the one way valve to break its seal and temporarily allow fluid to pass through the one-way valve in order to prime the nipple.

For example, in the embodiment whereby an umbrella valve 24 is used, in response to deformation of underlying plate 20, disc 26 will cease to sit directly on top of openings 22—thereby allowing fluid into the dispensing chamber 34. Thus, a user may squeeze the nipple's sides in order to impart lateral force in order to deform plate 20 of insert 18 and temporarily fail the one-way valve.

In embodiments of the invention, a bottle cover 44 is configured to allow a user to fail the valve without having to physically touch the nipple. For example, as shown, in an embodiment of the invention, cover 44 is provided with side tabs 46 that project toward the longitudinal axis of cover 44. Tabs 46 are configured to be positioned substantially parallel to insert 18 when the cover 44 is placed on a bottle. A user, may thus squeeze the sides of bottle cover 44 to urge side tabs 46 into the sides of the nipple 10. This allows a user to transmit force to the insert 18 and temporarily disturb its shape. As stated, such temporary disturbance causes the umbrella valve 24 to fail thereby allowing for the flow of fluid into the feeding chamber 34. In this manner, a user may orient the bottle so that the nipple 10 points toward the ground thereby allowing fluid to flow from the reservoir chamber 32, through holes 22 and into the dispensing chamber 34. Once a sufficient amount of fluid accumulates in the dispensing chamber 34, the user may release the force applied to the insert 18 and allow it to return to its default (non-deformed) position where it blocks backflow of fluid into the reservoir chamber 32.

In embodiments of the invention whereby a duckbill valve is used as a one-way valve, a similar system is utilized to apply side pressure to either side of the duckbill valve and force the flattened walls to part (as shown in FIG. 3B). Thus, a bottle that utilizes a duckbill valve may provided with side tabs that allow a user to press in order to transmit opposing forces to opposite sides of the duckbill valve in order to cause an opening 42 therein. Once an opening is achieved, the user may orient the bottle so that the nipple points toward the ground. In such position, fluid will flow from the reservoir chamber, through the opening in the duckbill valve and into the dispensing chamber. Once a sufficient amount of fluid accumulates in the dispensing chamber, the user may release the force applied to the duckbill valve and it will return to its default position of blocking backflow of fluid into the reservoir chamber.

Figure 4:
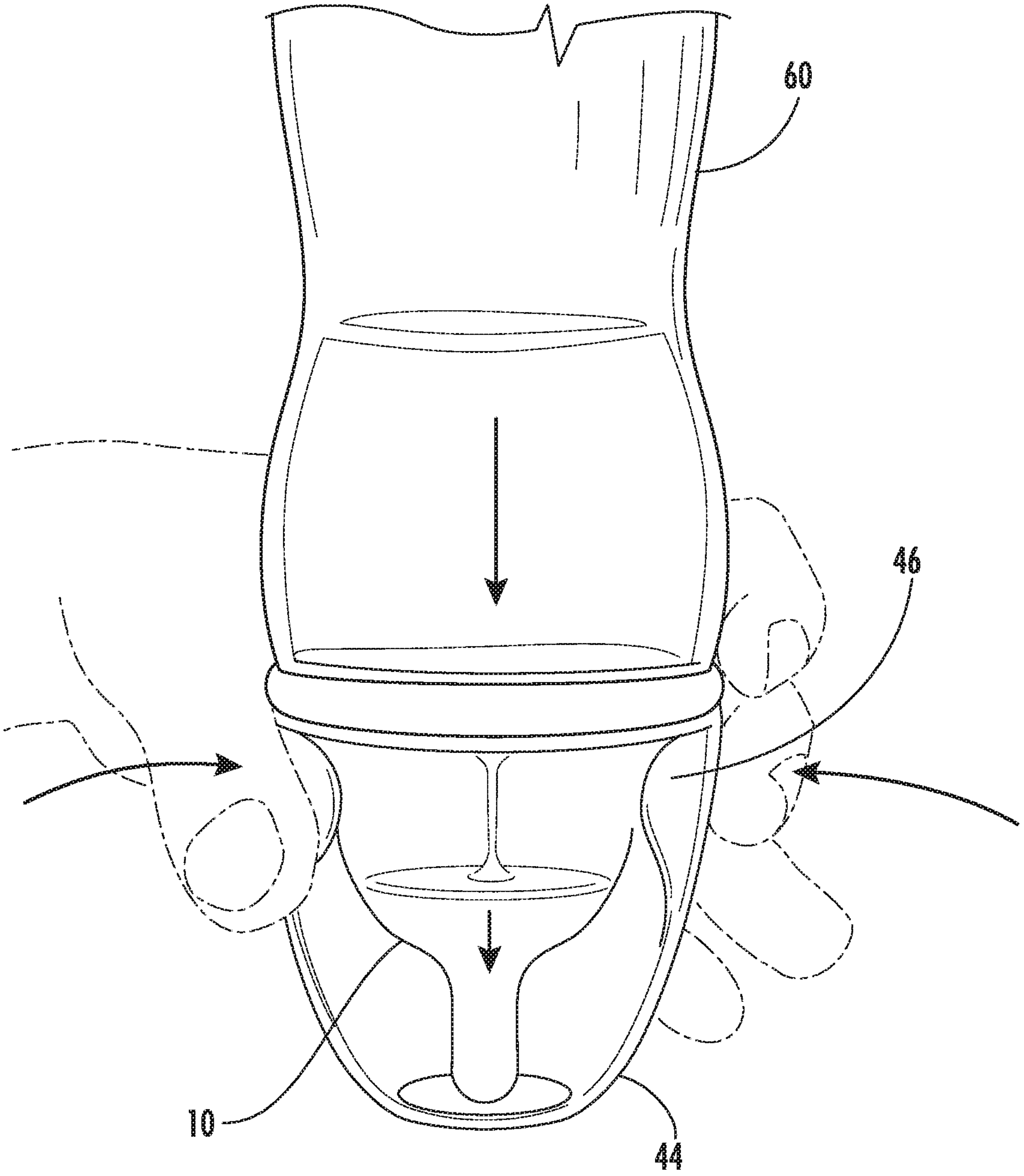
FIG. 4 shows a perspective view of a bottle and a cover seated thereon according to an exemplary embodiment of the invention.

In one embodiment of the invention, and as shown in FIG. 4, a bottle cover 44 is provided with contact tabs 46 on its inside surface. Tabs 46 face the longitudinal axis of cover 44 such that when seated on a bottle, tabs 46 face the nipple 10. In use, when the cover 44 is seated on the bottle top, the contact tabs 46 are positioned proximate to the outer perimeter of insert 18. A user squeezes on the cover and pushes the contact tabs 46 sufficient to deform the plate and allow the nipple 10 to become filled with milk or other fluid.

Figure 5:
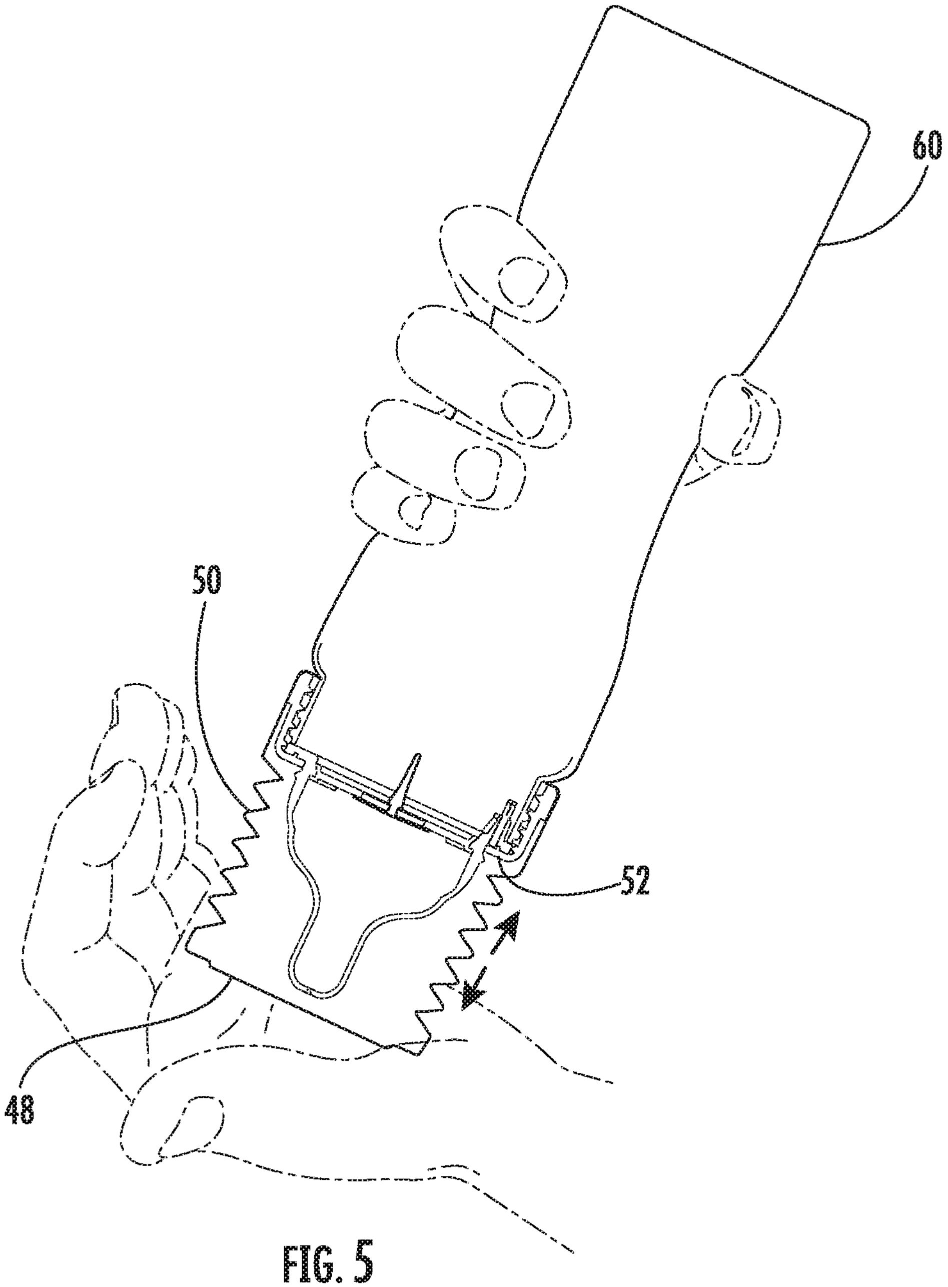
FIG. 5 shows a schematic side view of a bottle and a cover seated thereon being primed by a user according to an exemplary embodiment of the invention.

In yet another embodiment of the invention, a system for applying negative pressure to the nipple is utilized to prime the nipple. For example, FIG. 5 shows a bottle cover 48 having accordion walls 50 for allowing compression of the cover 48. In embodiments of the invention, cover 48 is used in conjunction with a baby bottle having an air inlet vent at an upper aspect. For example, in the embodiment shown in FIG. 5, an air inlet channel 52 is provided in the nipple or in the plastic collar that secures a nipple to a bottle. With cover 48 seated atop a bottle, a user pushes downward on the top of cover 48 to compress the cover 48. Cover 48, in turn, compresses the nipple 10 contained therein—thus removing air from the nipple. The cover 48 is then released so that it returns to its starting position. As such, the nipple 10 becomes restored to its original position. In the process of restoring to the nipple to its uncompressed position, however, the nipple applies negative pressure to the one way valve—thereby overcoming the valve and allowing milk to flow into the nipple.

Figure 6C:
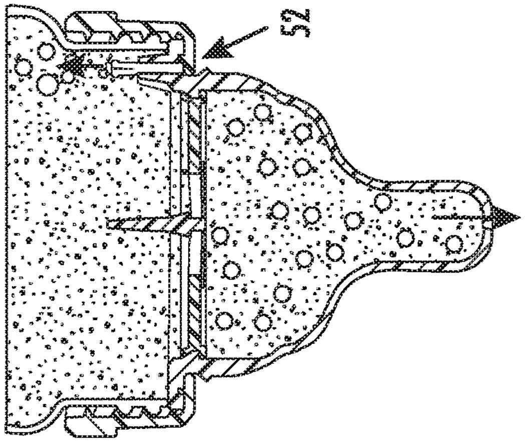
FIGS. 6A-C show partial cross-sectional view of the bottle and cover of FIG. 6 according to exemplary embodiments of the invention.
Figure 6B:
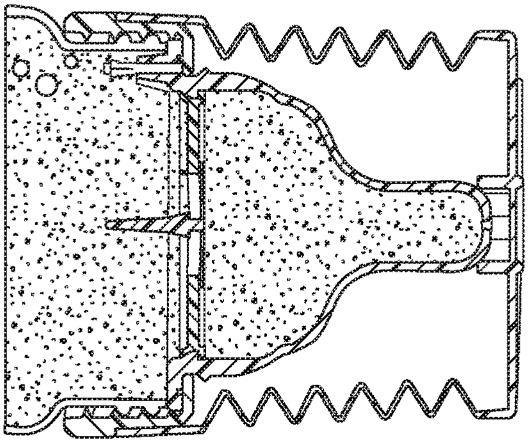
Figure 6A:
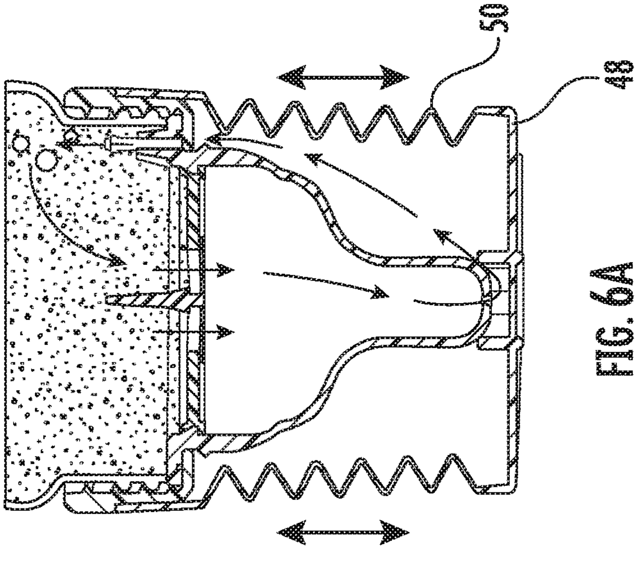

In an embodiment of the invention, and with reference to FIGS. 6A-C compression of cover 48 causes a circuit of air flow which results in the nipple becoming filled with liquid. That is, when cover 48 is pressed, not only does it force air out of the nipple, but it also forces air though channel 52 an into the reservoir chamber (6A), thus, increasing the gas pressure in the reservoir chamber. The combination of increased gas pressure in the reservoir chamber and the negative pressure created in the nipple, the one-way valve is overcome and liquid floods into the dispensing chamber (6B). It will be understood, that cap 32 may need to be pumped several times in order to allow the liquid to flow into the dispensing chamber. Once primed, the cap 48 is removed and the bottle is ready for feeding (6C).

Figure 7:
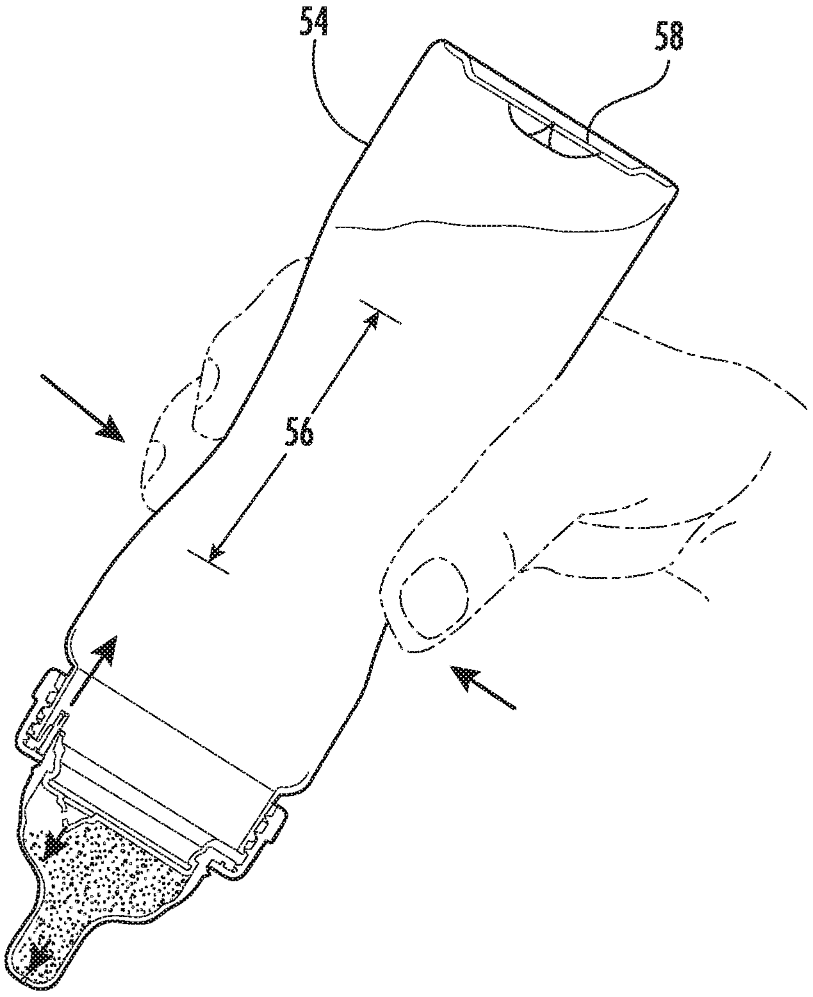
FIG. 7 shows a schematic side view of a pliable bottle held by a user according to an exemplary embodiment of the invention.

FIG. 7 shows another embodiment of the invention whereby positive pressure is used to prime the nipple. As shown, a bottle 54 is made of pliant material that may be compressed to force milk into the nipple. In embodiments of the invention, the entire bottle is formed of pliant material, whereas, in other embodiments only a segment of the bottle wall (e.g. central region 56) is formed of pliant material. In use, a user, squeezes on the bottle or the pliant area 56 thereof to force milk into the dispensing chamber 34. In embodiments of the invention walls of bottle 54 or segments thereof are pliable such the they are relatively easily deflected by an adult grip but not with a child's grip. For example, the walls may be pliable in range of 15-25 kg of grip pressure. In embodiments of the invention, bottle 54 is formed of food grade polypropylene.

It will be understood that although FIG. 7 shows a duckbill valve as the one-way valve, any of various one-way valves may be used in combination with a pliant bottle in different embodiments of the invention.

In embodiments of the invention once primed, air that was displaced when the bottle was squeezed is replenished via an air inlet valves disposed in any of various areas on the bottle 58. For example, in embodiments of the invention, air enters through channel 52, whereas in other embodiments, air enters through one way valve 58 disposed on the bottom surface of bottle 54.

Figure 8A:
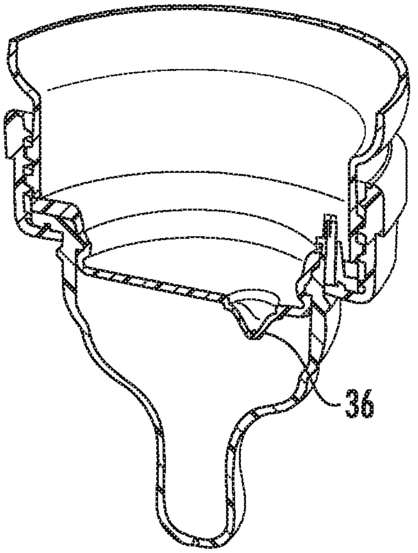
FIGS. 8A-B show cross-sectional views of an insert having an off-centered one-way valve according to an exemplary embodiment of the invention.
Figure 8B:
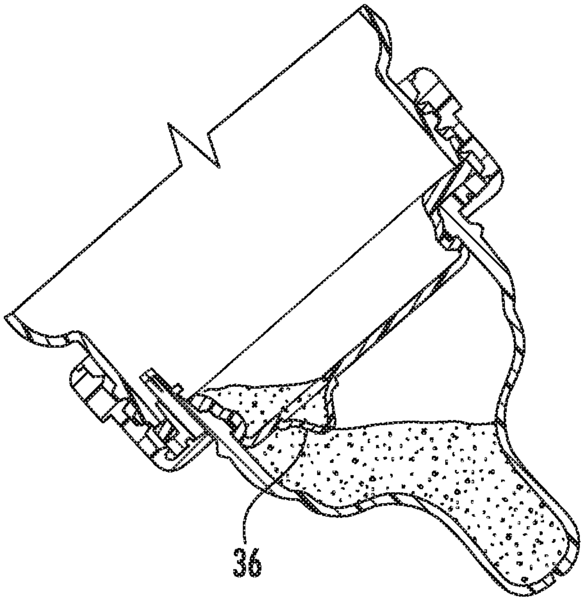
Figure 9A:
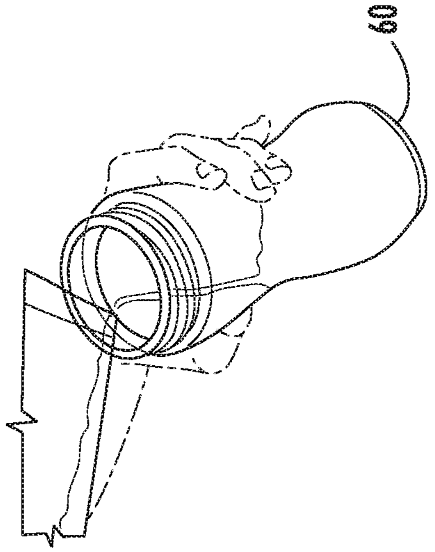
FIGS. 9A-F show schematic steps of a user preparing, priming and feeding a baby according to exemplary embodiments of the invention.
Figure 9B:
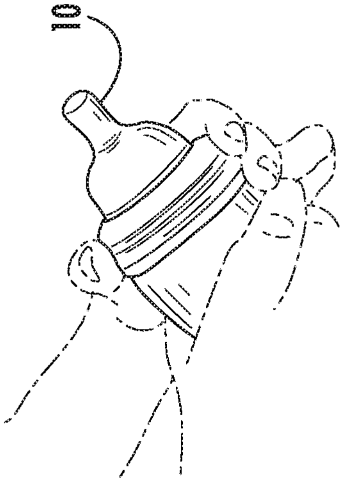
Figure 9C:
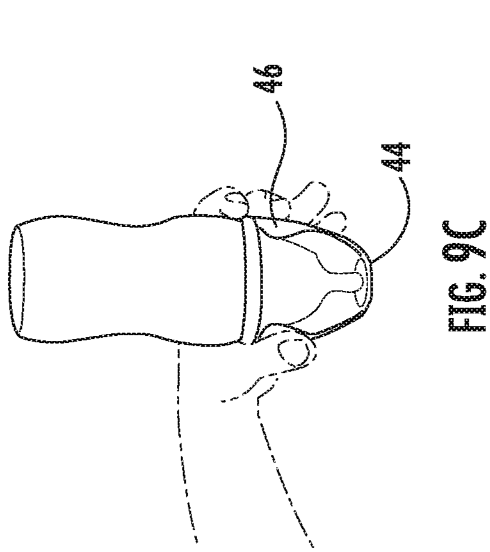
Figure 9D:
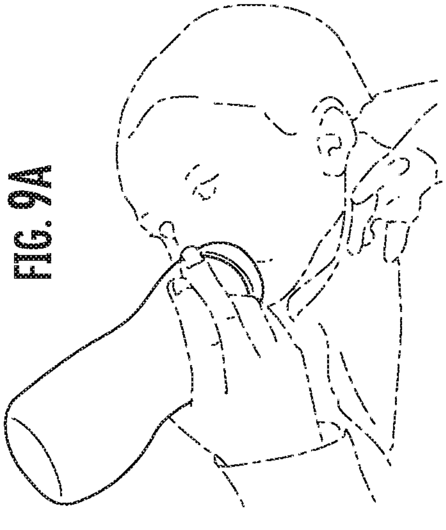
Figure 9E:
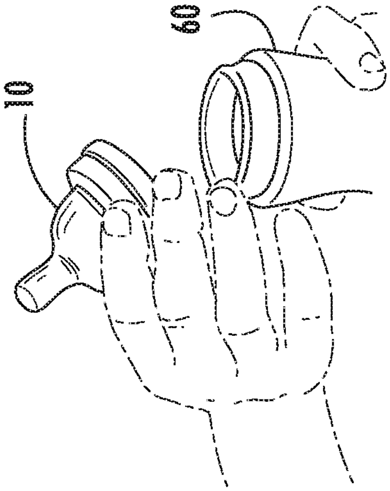
Figure 9F:
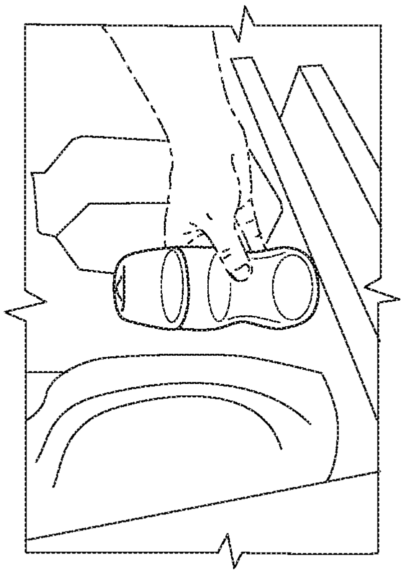

In embodiments of the invention, and as shown in FIG. 8A, a one way valve (e.g. a duckbill valve 36) is positioned in an off-center configuration on insert 18 so as to allow fluid flow even when the bottle is low on fluid. For example, as shown in FIG. 8B, even when the fluid level in the bottle is low, the fluid will find a pathway through the valve 36 when the bottle is held at an angle and flow into the nipple 10.

It will be understood that more than a single one-way valve may be provided on an insert in an off-centered manner. In this manner, a user may simply rotate the bottle to the closest one way valve when the fluid in the bottle runs low.

FIG. 9 shows illustrative representations of the method steps for filling, priming, and feeding a baby with a baby bottle having a one-way valve that may be overcome for the purpose of priming the nipple according to an embodiment of the invention. As shown, bottle 60 is filled with fluid such as milk (FIG. 9A), and a nipple having an insert 18 mounted therein is secured to the bottle 60 (9B). Thereafter, the bottle 60 is overturned and the user squeezes on the sides of the nipple 10 (either directly or through cover 44) to cause the one-way valve to temporarily fail and allow fluid to flow into the nipple (9C). With the nipple primed, a user may begin feeding an infant (9D). Once feeding is complete, the user may remove the nipple and insert (9E) for cleaning, and store the remaining milk for later use (9F).

In one embodiment of the invention, a plate assembly is disposed between the reservoir chamber and dispensing chamber that is provided with a one way valve and a bypass valve. The bypass valve is configured to circumvent the one way valve and allow liquid flow into the nipple for purposes of priming the nipple. For example, FIG. 10 shows an exploded view of a plate assembly 64 used to separate a reservoir chamber from a dispensing chamber according to an embodiment of the invention. As shown, plate assembly 64 is formed of an upper collar 66 and a lower ringr 68. Upper collar 66 is seated on lower ring 68 and the upper collar 66, and lower ring 68 are rotatable with respect to each other. Upper collar 66 surrounds an interior floor surface 70, which separates the bottle to form a lower reservoir chamber and a dispensing chamber. A hole or cutout is made in the center of floor surface 70, within which a one-way valve is set. In embodiments of the invention, a slit valve 72 is utilized, but any of various one way valves including umbrella valves, duck bill valves or those similar thereto are within the teaching of the invention. Top surface 70A of floor surface 70 serves as the bottom surface of a dispensing chamber according to an embodiment of the invention.

In use, lower ring 68 is threaded to the top of any of various known bottles and a nipple is threaded onto upper collar 66.

In embodiment of the invention, at least one, and preferably two other holes or cutouts are made in floor surface 70. For example, as shown, a first bypass hole 74 and a second bypass hole 76 are made on either side of valve 72.

As shown, in embodiments of the invention, lower ring 68 surrounds a substantially open area 78. One or more appendages extend (e.g. leaf springs) from an inner lip 56 of lower collar 44 and insert into the open area 54. As shown, a first arm 82 and a second arm 84 extend from inner lip 80 and terminate in open area 78. The distal end of each arm 82, 84 terminates in a circular plug 86, 88. Plugs 86, 88 preferably have a convex upper surface. The centers of plugs 86, 88 are sized and shaped to insert into the centers of bypass holes 74, 76. When plugs 86, 88 contact bypass holes 74, 76 liquid can only pass through the one way valve 72, whereas, when plugs 86, 88 are moved away from bypass holes 74, 76 liquid may freely flow through the bypass holes 74, 76—by-passing the one way valve 72.

Figure 10A:
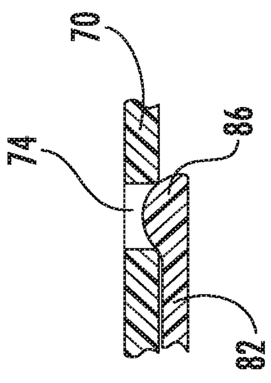
FIG. 10A shows a cross-sectional view of a plug inserted into a bypass valve of FIG. 10 according to an exemplary embodiment of the invention.
Figure 10:
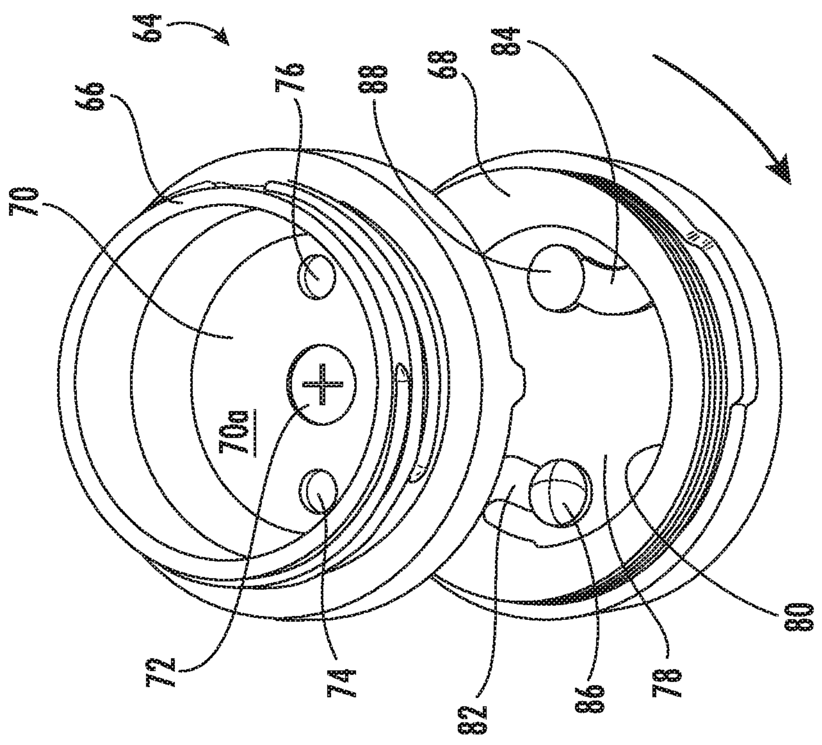
FIG. 10 shows an exploded view of a plate assembly having a one-way valve and bypass valves according to exemplary embodiments of the invention.

FIG. 10A shows a broken away cross-sectional view of a plug 86 inserted into bypass hole 74 and plugging the same according to an embodiment of the invention.

In a preferred embodiment, arms 82, 84 are biased upward so as to urge respective plugs 86, 88 into respective bypass holes 74, 76.

Figure 11:
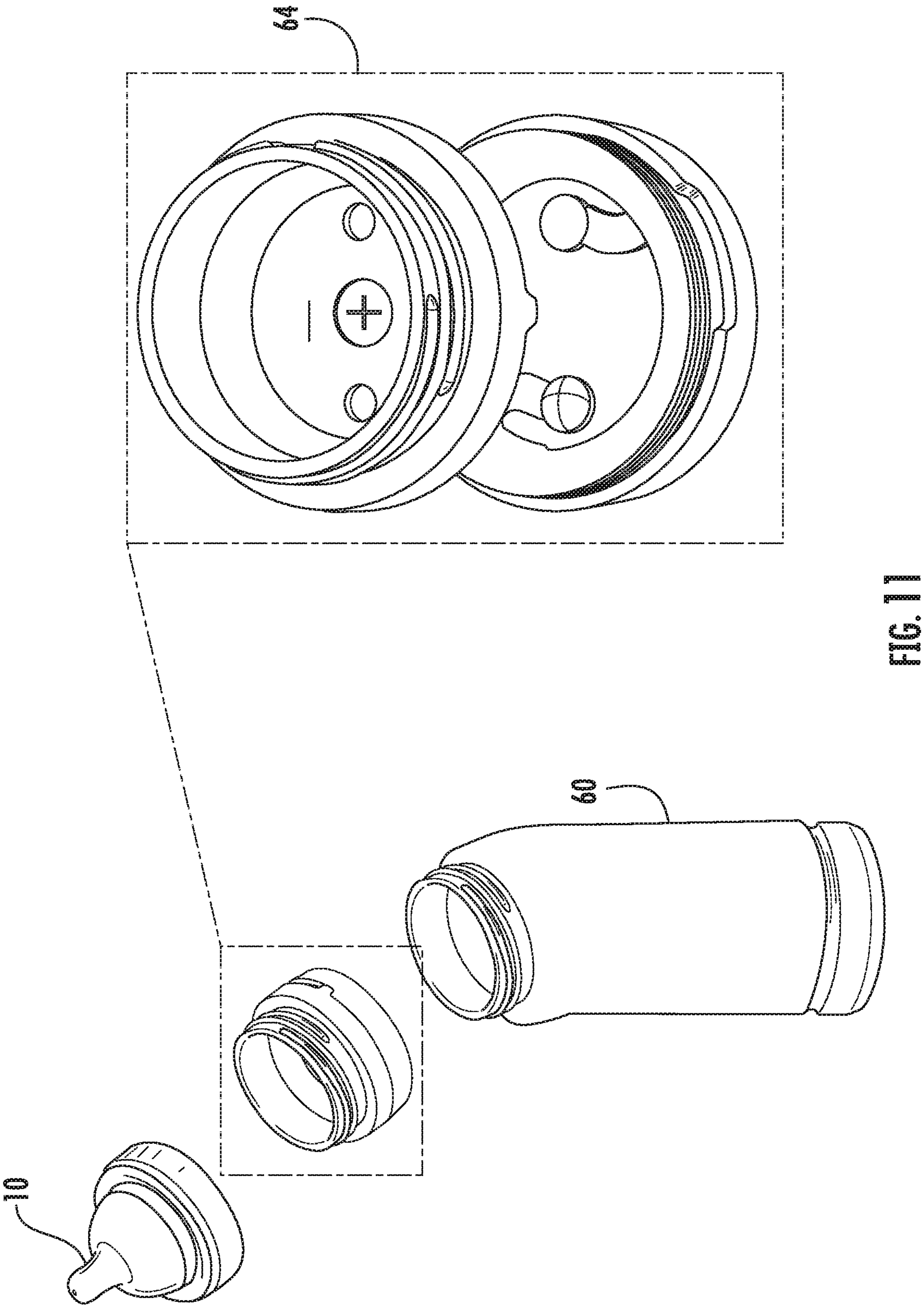
FIG. 11 shows an exploded view of the a plate assembly and a bottle according to exemplary embodiments of the invention.

FIG. 11 shows an exploded view of plate assembly 64 and integrated with a baby bottle and nipple according to an embodiment of the invention.

Figure 12C:
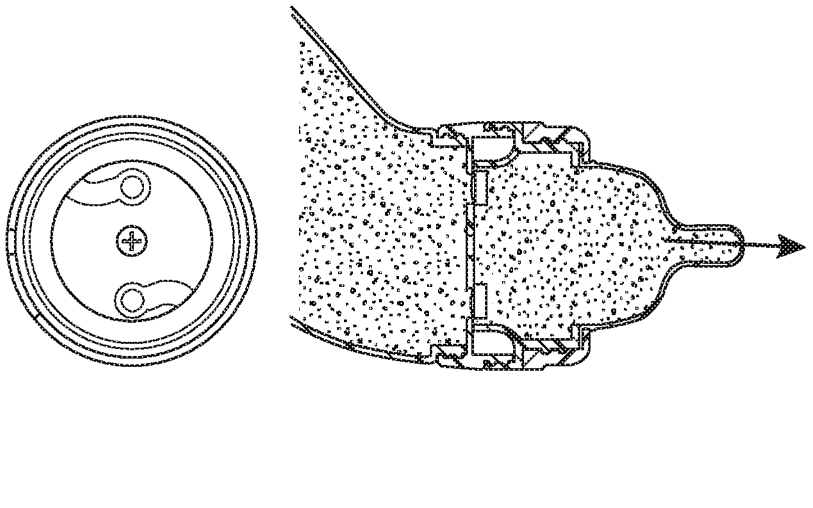
FIGS. 12A-C show schematic top and side cross-sectional view of the plates assembly in use according to exemplary embodiments of the invention.
Figure 12B:
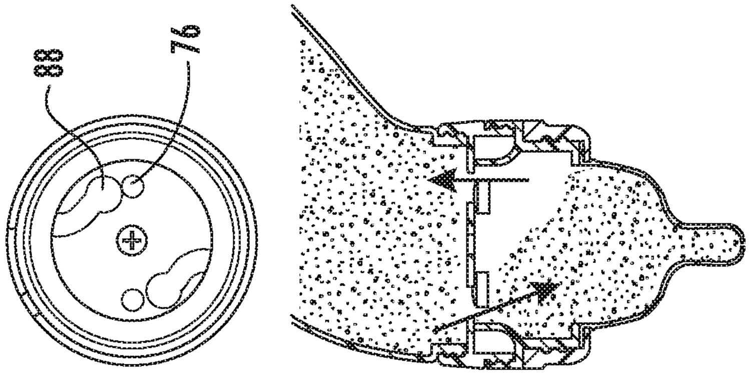
Figure 12A:
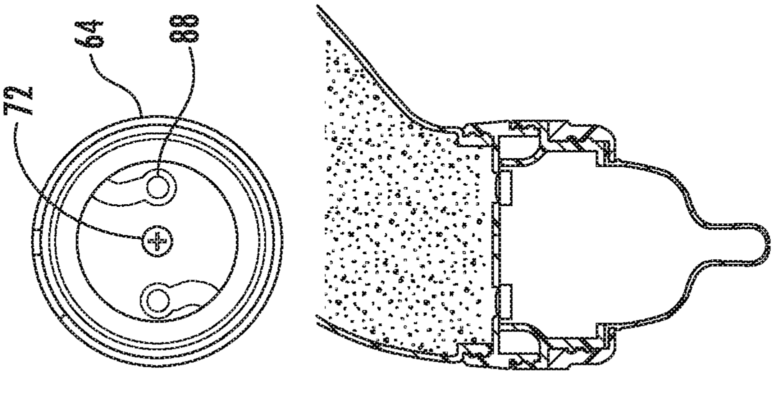
Figure 13A:
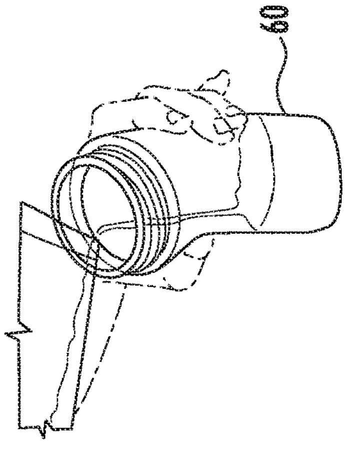
FIGS. 13A-G show schematic steps of a user preparing, priming and feeding a baby according to exemplary embodiments of the invention.
Figure 13B:
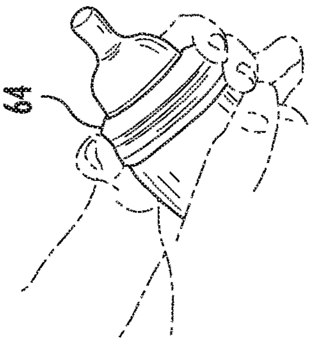
Figure 13C:
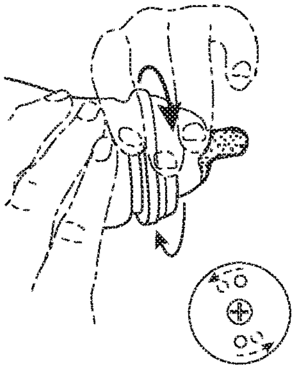
Figure 13D:
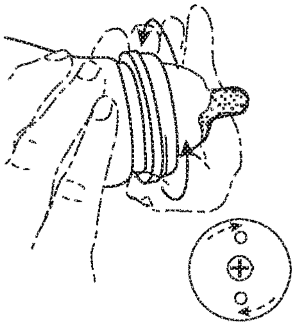
Figure 13E:
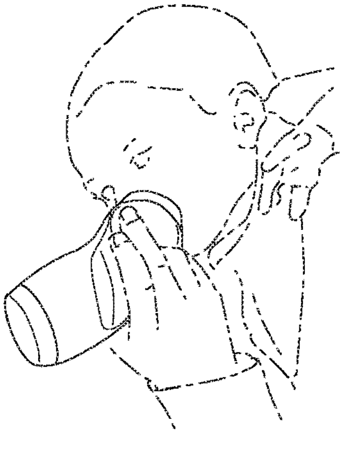
Figure 13F:
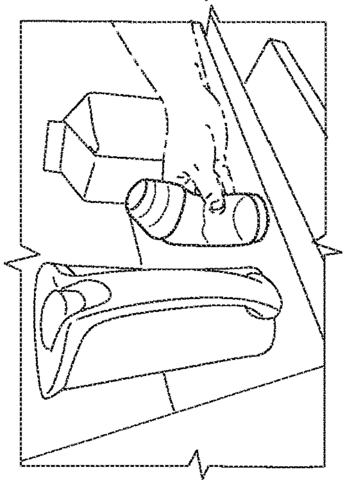
Figure 13G:
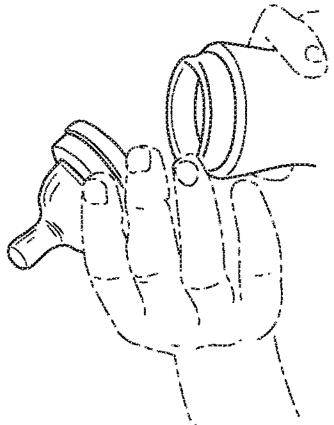

FIG. 12 shows schematic views of the use of a bottle having an integrated plate assembly 64 as described. At step 1 (13A) upper collar and lower ring 42, 44 are positioned such that plugs 86, 88 block respective bypass holes 74, 76. Prior to beginning feeding, a user rotates upper collar 66 with respect to lower ring 68 so as to move plugs 86, 88 from bypass holes 74, 76 (13B). The user will then position the bottle with the nipple pointed downward so that milk will flow from the reservoir chamber through the bypass holes 74, 76 and into the interior of the nipple (dispensing chamber). Once there is sufficient fluid to fill the dispensing chamber, the user rotates the upper collar 66 back to starting position where the plugs 86, 88 block the bypass holes 74, 76 (12C). Once the baby begins sucking, milk will flow out of the nipple. The negative pressure will cause liquid from the reservoir to flow into the dispensing chamber. As described, importantly, liquid will flow in a single direction—out of the reservoir chamber, but not back thereto.

FIG. 13 shows illustrative representations of the method steps for filling, priming, and feeding a baby with a baby bottle having a bypass valve according to an embodiment of the invention. As shown, bottle 60 is filled with fluid such as milk (FIG. 13A). The plate assembly 64 and attached nipple is then mounted on the bottle (13B). Alternatively, plate assembly 64 is mounted on the bottle 60, and thereafter, the nipple is mounted to the plate assembly. In order to prime the nipple, a user rotates the plate assembly to remove the plugs from the bypass holes (13C), and once sufficiently primed, the user rotates the plate assembly to cover the bypass holes (13D). Thereafter, the user may begin feeding an infant (13E).

Having described this invention with regard to specific embodiments, it is to be understood that the description is not meant as a limitation since further modifications and variations may be apparent or may suggest themselves to those skilled in the art. It is intended that the present application cover all such modifications and variations.

What is claimed is:

1. An insert and feeding bottle system, comprising:

a bottle forming a reservoir chamber comprising walls having a first segment and a second segment, a bottom surface and an upper opening substantially parallel to the bottom surface, whereby the first segment of the reservoir chamber walls comprises pliant material and is substantially circular in cross-section, and the second segment of the reservoir chamber wall comprises non-pliant material and is substantially circular in cross-section;

a nipple disposed above the reservoir chamber, the nipple comprising a dispensing chamber;

a circular plate sized and shaped to be mounted over the opening of the reservoir chamber between the reservoir chamber and the nipple, the circular plate configured to separate the reservoir chamber and the dispensing chamber;

a one-way valve disposed on the circular plate for allowing the passage of fluid from the reservoir chamber in response to negative pressure;

whereby the pliant material is configured to be deflected a sufficient distance to directly contact fluid that is in direct contact with the pliant material to force fluid through the one-way valve and cause the one-way valve to temporarily fail and cause the flow of fluid from the reservoir chamber to the dispensing chamber in the absence of negative pressure, whereby the reservoir chamber is configured to store fluid in the absence of negative pressure.

2. The insert and feeding bottle system of claim 1, wherein the one-way valve comprises an umbrella valve.

3. The insert and feeding bottle system of claim 1, wherein the one-way valve comprises a duckbill valve.

4. The insert and feeding bottle system of claim 1, wherein the one-way valve comprises a slit valve.

5. The insert and feeding bottle system of claim 1 wherein the segment of the reservoir chamber formed of pliant walls is pliable in a range of 15-25 kg of grip pressure.

6. The insert and feeding bottle system of claim 1, further comprising a collar for securing the nipple to the reservoir chamber, whereby the circular plate is surrounded by the collar and wherein the one-way valve is disposed on the insert in an off-centered manner.

* * * * *